United States Patent
Chao et al.

(10) Patent No.: US 8,264,955 B2
(45) Date of Patent: Sep. 11, 2012

(54) INTERNET PROTOCOL FAST REROUTE FOR SHARED RISK LINK GROUP FAILURE RECOVERY

(75) Inventors: H. Jonathan Chao, Holmdel, NJ (US); Kang Xi, Harrison, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 133 days.

(21) Appl. No.: 12/483,912

(22) Filed: Jun. 12, 2009

(65) Prior Publication Data

US 2010/0315943 A1    Dec. 16, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ......................................................... 370/227
(58) Field of Classification Search .................. 370/217, 370/218, 225, 227, 228
See application file for complete search history.

(56) References Cited

U.S. PATENT DOCUMENTS

| | | | | |
|---|---|---|---|---|
| 2002/0131424 | A1* | 9/2002 | Suemura | 370/400 |
| 2003/0016624 | A1* | 1/2003 | Bare | 370/217 |
| 2005/0276216 | A1* | 12/2005 | Vasseur et al. | 370/222 |
| 2006/0114818 | A1* | 6/2006 | Canali et al. | 370/216 |
| 2008/0049622 | A1* | 2/2008 | Previdi et al. | 370/237 |

* cited by examiner

*Primary Examiner* — Huy D Vu
*Assistant Examiner* — Adnan Baig
(74) *Attorney, Agent, or Firm* — John C. Pokotylo; Straub & Pokotylo

(57) ABSTRACT

A scheme to achieve fast recovery from SRLG failures in the IP layer is described. An exemplary scheme, called multi-section shortest path first ("MSSPF"), builds on the idea of IP Fast Reroute ("IPFRR"), guarantees 100% recovery of SRLG failures and causes no dead loops. Given a source node, a destination node, and a shared risk group failure on a next hop from the source node to the destination node, failure recovery information may be determined by (1) accepting a graph representing network topology information including the source node and the destination node, (2) determining a node which is able to reach the destination node using a route which does not include the source node, wherein a path from the source node to the determined node is not affected by the shared risk group failure, and (3) storing, in association with the shared risk group failure, both (i) a network address associated with the determined node and (ii) an alternative output port of the source node using the shortest path from the source node to the determined node.

13 Claims, 13 Drawing Sheets

REROUTE UNDER f1

| DESTINATION | FAILURE f1 | | FAILURE f2 | | ...FAILURE fn | |
|---|---|---|---|---|---|---|
| | EXIT ADDRESS | PORT # | EXIT ADDRESS | PORT # | EXIT ADDRESS | PORT # |
| . . . . . . . . | . . . . . . . | . . . . . . . | . . . . . . . | . . . . . . . | . . . . . . . | . . . . . . . |

510 → DESTINATION
520a → FAILURE f1
520b → FAILURE f2
520c → ...FAILURE fn 500
(ROUTING TABLE OF A NODE GIVEN SRLG FAILURES)

FIGURE 5

| ROW | DESTINATION | FAILURE f1 | | FAILURE f2 | |
|---|---|---|---|---|---|
| | | EXIT ADDRESS | PORT # | EXIT ADDRESS | PORT # |
| 1 | a | i→d | c→e | - | - |
| 2 | b | g→b | c→e | - | - |
| 3 | d | i→d | c→e | - | - |
| 4 | e | - | - | b→g | b→g |
| 5 | g | - | - | b→g | b→g |
| 6 | h | - | - | b→g | b→g |
| 7 | i | - | - | b→g | b→g |

FIGURE 10

| PREFIX | NEXT HOP | OUTPUT PORT # | ROW # IN REROUTING TABLE |
|---|---|---|---|
| a | a | c→a | 1 |
| b | a | c→a | 2 |
| d | a | c→a | 3 |
| e | e | c→e | 4 |
| g | e | c→e | 5 |
| h | e | c→e | 6 |
| i | e | c→e | 7 |

FIGURE 11

INTERNET PROTOCOL FAST REROUTE FOR SHARED RISK LINK GROUP FAILURE RECOVERY

§1. BACKGROUND OF THE INVENTION

§1.1. Field of the Invention

The present invention concerns Internet Protocol ("IP") networks. In particular, the present invention concerns recovery from shared risk link group failures using rerouting schemes that determine a node, within an IP network, used for rerouting, wherein the exit address of the determined node is used for IP-in-IP encapsulation.

§1.2 Background Information

With the Internet providing services to more critical applications, achieving high survivability under various types of network failures has become increasingly important. In particular, it is highly desired that services interrupted by network failures resume within a very short period of time to minimize potential loss. (See, e.g., S. Rai, B. Mukherjee, and O. Deshpande, "IP resilience within an autonomous system: current approaches, challenges, and future directions," *IEEE Commun. Mag.*, Vol. 43, No. 10, pp. 142-149, October 2005.) Fast failure recovery is critical to applications such as distance medical service, real-time media delivery, stock-trading systems, and online gaming, where a long disruption could cause a tremendous loss.

Failures are common in today's network, either because of maintenance mistakes or accidents (e.g., fiber cut, interface malfunctioning, software bugs, misconfiguration, etc.). Despite continuous technological advances, such failures have not been completely avoided. Indeed, statistics show that failures occur quite frequently, even in well-maintained backbones. (See, e.g., A. Markopoulou, G. Iannaccone, S. Bhattacharyya, C.-N. Chuah, and C. Diot, "Characterization of failures in an IP backbone," in *IEEE INFOCOM*, March 2004.) It is widely believed that failures will remain unavoidable in the Internet in the foreseeable future, which makes the demand for high-performance failure recovery solutions even more urgent.

In today's IP networks, failures can be recovered from by advertising the failures throughout the network, performing route recalculation, and updating forwarding tables at each affected router. This scheme, while theoretically sound, could cause long service disruptions. (See, e.g., M. Shand and S. Bryant, "IP fast reroute framework," Internet-Draft (work in progress), February 2008. [Online]. Available: http://tools.ietf.org/html/draft-ietf-rtgwg-ipfrr-framework-08, C. Labovitz, A. Ahuja, A. Bose, and F. Jahanian, "Delayed internet routing convergence," in *SIGCOMM*, 2000, pp. 175-187, and "Delayed internet routing convergence," *IEEE/ACM Trans. Netw.*, Vol. 9, No. 3, pp. 293-306, June 2001.) To achieve fast failure recovery, most IP networks rely on lower layer protection such as using label switched path ("LSP") protection in multiprotocol label switching ("MPLS") networks, automatic protection switching ("APS") in a synchronous optical network ("SONET"), and lightpath protection in IP over wavelength division multiplexing ("WDM") networks. (See, e.g., V. Sharma and F. Hellstrand, "Framework for Multi-Protocol Label Switching (MPLS)-based Recovery," RFC 3469 (Informational), February 2003. [Online]. Available: http://www.ietf.org/rfc/rfc3469.txt, T.-H. Wu and R. C. Lau, "A class of self-healing ring architectures for SONET network applications," *IEEE Trans. Commun.*, vol. 40, no. 11, pp. 1746-1756, November 1992, K. Kompella and Y. Rekhter, "OSPF Extensions in Support of Generalized Multi-Protocol Label Switching (GMPLS)," RFC 4203 (Proposed Standard), October 2005. [Online]. Available: http://www.ietf.org/rfc/rfc4203.txt, W. Lai and D. McDysan, "Network Hierarchy and Multilayer Survivability," RFC 3386 (Informational), November 2002. [Online]. Available: http://www.ietf.org/rfc/rfc3386.txt, V. Sharma and F. Hellstrand, "Framework for Multi-Protocol Label Switching (MPLS)-based Recovery," RFC 3469 (Informational), February 2003. [Online]. Available: http://www.ietf.org/rfc/rfc3469.txt, D. Papadimitriou and E. Mannie, "Analysis of Generalized Multi-Protocol Label Switching (GMPLS)-based Recovery Mechanisms (including Protection and Restoration)," RFC 4428 (Informational), March 2006. [Online]. Available: http://www.ietf.org/rfc/rfc4428.txt, L. Sahasrabuddhe, S. Ramamurthy, and B. Mukherjee, "Fault management in IP-over-WDM networks: WDM protection versus IP restoration," *IEEE J. Sel. Areas Commun.*, Vol. 20, No. 1, pp. 21-33, January 2002, D. Zhou and S. Subramaniam, "Survivability in optical networks," *IEEE Netw.*, Vol. 14, No. 6, pp. 16-23, November/December 2000, and S. Ramamurthy and B. Mukherjee, "Survivable WDM Mesh Networks part I-protection," in *Proc. IEEE INFOCOM*, Vol. 2, 1999, pp. 744-751.) In such schemes, for each working path, a link (or node) disjoint backup path is established. When a failure occurs on a working path, the traffic is immediately switched to the corresponding backup path to resume the service. In 1+1 protection, each protection path reserves dedicated bandwidth. Unfortunately, this incurs high costs because the bandwidth on the protection paths is not used in normal operation. To improve resource utilization, multiple protection paths can be designed to share bandwidth as long as they will not be in use simultaneously (i.e., the corresponding working paths will not fail at the same time), which is called shared path protection. (See e.g., Y. Xiong, D. Xu, and C. Qiao, "Achieving Fast and Bandwidth-Efficient shared-path protection," *J Lightw. Technol.*, vol. 21, no. 2, pp. 365-371, 2003 and D. Xu, C. Qiao, and Y. Xiong, "Ultrafast Potential-Backup-Cost (PBC)-based shared path protection schemes," *J Lightw. Technol.*, vol. 25, no. 8, pp. 2251-2259, 2007.) Although path protection is effective, it has the disadvantage of low resource utilization and introduces extra complexity on network design and maintenance. More importantly, using lower layer protection means that the IP layer cannot achieve survivability independently.

In IP over wavelength-division multiplexing ("WDM") architecture, the logical IP topology is built on top of the physical network, where routers are interconnected through wavelength channels, as shown in FIG. 1. Since each fiber carries multiple wavelength channels, a failure on a fiber results in multiple simultaneous logical link failures in the IP network. These logical links are called a shared risk link group ("SRLG"). (See, e.g., L. Shen, X. Yang, and B. Ramamurthy, "Shared risk link group (SRLG)-diverse path provisioning under hybrid service level agreements in wavelength-routed optical mesh networks," *IEEE/ACM Trans. Netw.*, Vol. 13, No. 4, pp. 918-931, August 2005, D. Xu, Y. Xiong, C. Qiao, and G. Li, "Failure protection in layered networks with shared risk link groups," *IEEE Netw.*, Vol. 18, No. 3, pp. 36-41, May 2004.) In FIG. 1, when a fiber cut (depicted by an "X") occurs, it causes three (3) logical link failures: R1-R3; R2-R3; and R2-R4. The traditional solutions for SRLG failure recovery are to set up a protection wavelength for each logical link, or to establish a backup fiber to protect each fiber. Such protection requires considerable redundant bandwidth and introduces design complexity.

§1.2.1 IP Fast Reroute and Related Work

Recently, a scheme called IP Fast Reroute was proposed to achieve ultra-fast failure recovery in the IP layer without specific requirements on the lower layers. (See, e.g., M. Shand and S. Bryant, "IP fast reroute framework," Internet-Draft (work in progress), February 2008. [Online]. Available: http://tools.ietf.org/html/draft-ietf-rtgwg-ipfrr-framework-08, M. Shand, S. Bryant, and S. Previdi, "IP fast reroute using not-via addresses," Internet-Draft (work in progress), February 2008. [Online]. Available: http://www.ietf.org/internet-drafts/draftbryant-shand-ipfrr-notvia-addresses-02.txt, A. Atlas and A. Zinin, "Basic specification for IP fast-reroute: loop-free alternates," Internet-Draft (work in progress), February 2008. [Online]. Available: http://www.ietf.org/internet drafts/draft-ietf-rtgwg-ipfrr-specbase-11.txt, C. Perkins, "IP Encapsulation within IP," RFC 2003 (Proposed Standard), October 1996. [Online]. Available: http://www.ietf.org/rfc/rfc2003.txt, S. Lee, Y. Yu, S. Nelakuditi, Z. Zhang, and C.-N. Chuah, "Proactive vs reactive approaches to failure resilient routing," in *IEEE INFOCOM*, March 2004, Z. Zhong, S. Nelakuditi, Y. Yu, S. Lee, J. Wang, and C.-N. Chuah, "Failure inferencing based fast rerouting for handling transient link and node failures," in *IEEE Global Internet*, March 2005 and A. Kvalbein et al., "On failure detection algorithms in overlay networks," in *IEEE INFOCOM*, April 2006.) The basic idea is to let each router find proactively an alternate port for a destination (that is, a port different from its primary forwarding port). In normal operation, the alternate port is not used. After a failure is detected on the primary port, the alternate port is immediately used for packet forwarding. FIG. 2 shows an example of IPFRR in which node g sets g→h as the alternate port to node a. In normal operation, packets going to node a are forwarded through {g,b,a}. When link (or port) g→b fails, the alternate port is immediately used to forward packets through {g,h,e,c,a}.

Since such alternate ports are calculated and configured in advance, IPFRR can achieve ultra-fast failure recovery. A comparison between traditional route recalculation and IPFRR is illustrated by FIGS. 3A and 3B. As shown in FIG. 3A, with route recalculation, the service disruption lasts until the failure advertising, route recalculation, and forwarding table updates are completed. In contrast, as shown in FIG. 3B, the service disruption using IPFRR is greatly shortened by resuming packet forwarding immediately after the failure is detected. In parallel to IPFRR, traditional failure advertising, routing recalculation, and convergence, load balancing, routing table updates, etc., can be performed. Since, however, service is restored while such other (recalculation) activities occur the network can tolerate the longer time needed for these (recalculation) activities.

There are two main challenges when designing IPFRR schemes. The first challenge is ensuring loop-free rerouting. That is, when a node sends packets through its alternate port, the packets must not return to the same node. The second challenge is guaranteeing 100% failure recovery (that is, ensuring recovery from every potential failure).

Existing research on IPFRR focuses mainly on single-link and single-node failures in the IP layer, such as failure insensitive routing ("FIR"). (See, e.g., S. Lee, Y. Yu, S. Nelakuditi, Z. Zhang, and C.-N. Chuah, "Proactive vs reactive approaches to failure resilient routing," in *IEEE INFOCOM*, March 2004, Z. Zhong, S. Nelakuditi, Y. Yu, S. Lee, J. Wang, and C.-N. Chuah, "Failure inferencing based fast rerouting for handling transient link and node failures," in *IEEE Global Internet*, March 2005.), multiple routing configuration ("MRC") (See, e.g., "Fast IP network recovery using multiple routing configurations," in *IEEE INFOCOM*, April 2006.), routing with path diversity (See, e.g., X. Yang and D. Wetherall, "Source selectable path diversity via routing deflections," in *ACM Sigcomm*, 2006.), and efficient scan for alternate paths ("ESCAP") (See, e.g., K. Xi and H. J. Chao, "IP fast rerouting for single-link/node failure recovery," in *IEEE BroadNets*, 2007, "ESCAP: Efficient scan for alternate paths to achieve IP fast rerouting," in *IEEE Globecom*, 2007.). One scheme that handles SRLG failures is called NotVia (See, e.g., M. Shand, S. Bryant, and S. Previdi, "IP fast reroute using not-via addresses," Internet-Draft (work in progress), February 2008. [Online]. Available: http://www.ietf.org/internet-drafts/draftbryant-shand-ipfrr-notviaaddresses-02.txt.). Its principle can be explained using node g in FIG. 2:

1) For potential failure b-g, NotVia removes link b-g, gives node b a special IP address $b_g$, and calculates a path from g to $b_g$, which is {g,h,e,c,a,b};

2) The calculated path is installed in nodes g,h,e,c and a so that they know how to forward packets whose destination addresses are $b_g$;

3) When node g detects a failure on link b-g and then receives a packet {src=x,dst=a} {payload}, it encapsulates the packet as {{src=g,dst=$b_g$} {src=x,dst=a} {payload}}. Since the new packet uses $b_g$ as the destination address, it will reach node b through {g,h,e,c,a,b}. This is called IP-in-IP tunneling. (See, e.g., W. Simpson, "IP in IP Tunneling," RFC 1853 (Informational), October 1995. [Online]. Available: http://www.ietf.org/rfc/rfc1853.txt.)

4) Receiving the encapsulated packet, node b performs decapsulation by removing the outer IP header. The inner part is the original IP packet and is forwarded to node a.

This example shows that NotVia is similar to the link-based protection in MPLS, where the special address $b_g$ works like a label to control the forwarding at each node such that the protection path does not traverse the failure. This method can be easily extended to cover SRLG failures. The only modification is to remove all the SRLG links in the first step when calculating the protection paths. As with MPLS link-based protection, NotVia may suffer from long path length in certain situations. In the example, the shortest path from g to a is {g,h,e,c,a}, while the actual path is {g,h,e,c,a,b,a}. As this example illustrates, NotVia produced two unnecessary hops: a→b; b→a.

§2. SUMMARY OF THE INVENTION

Embodiments consistent with the present invention provide a scheme to achieve fast recovery from SRLG failures in the IP layer. An exemplary scheme consistent with the present invention, called multi-section shortest path first ("MSSPF"), builds on the idea of IP Fast Reroute ("IPFRR"). The present inventors have verified that MSSPF guarantees 100% recovery of SRLG failures and causes no dead loops. Advantageously, it has a low complexity and can be implemented in today's networks running link-state routing protocols such as open shortest path first ("OSPF"). The performance of the exemplary scheme has been validated with a variety of practical and randomly generated topologies.

Embodiments consistent with the present invention may be used to determine failure recovery information, given a source node, a destination node, and a shared risk group failure on a next hop from the source node to the destination node. Such embodiments might do so by (1) accepting a graph representing network topology information including the source node and the destination node, (2) determining a node which is able to reach the destination node using a route which does not include the source node, wherein a path from the source node to the determined node is not affected by the shared risk group failure, and (3) storing, in association with the shared risk group failure, both (i) a network address associated with the determined node and (ii) an alternative output port of the source node using the shortest path from the source node to the determined node.

Then a packet received by a receiving node may be forwarded by (1) determining destination information from the received packet, (2) using the determined destination information to lookup a primary output port for forwarding the packet, (3) determining whether or not the primary output port has failed, and (4) if it is determined that the primary output port has not failed, forwarding the received packet on the determined primary output port, but otherwise (i) obtaining an exit address and an alternative output port using a shared risk group failure identifier and the determined destination information, (ii) encapsulating the received packet for forwarding to the obtained exit address to generate an encapsulated packet, and (iii) forwarding the encapsulated packet on the obtained alternative output port.

§3. BRIEF DESCRIPTION OF THE DRAWINGS

FIG. 5 is an exemplary data structure of a routing table of a router/node within an IP network for rerouting packet information given an SRLG failure, consistent with the present invention.

Figure 6B:
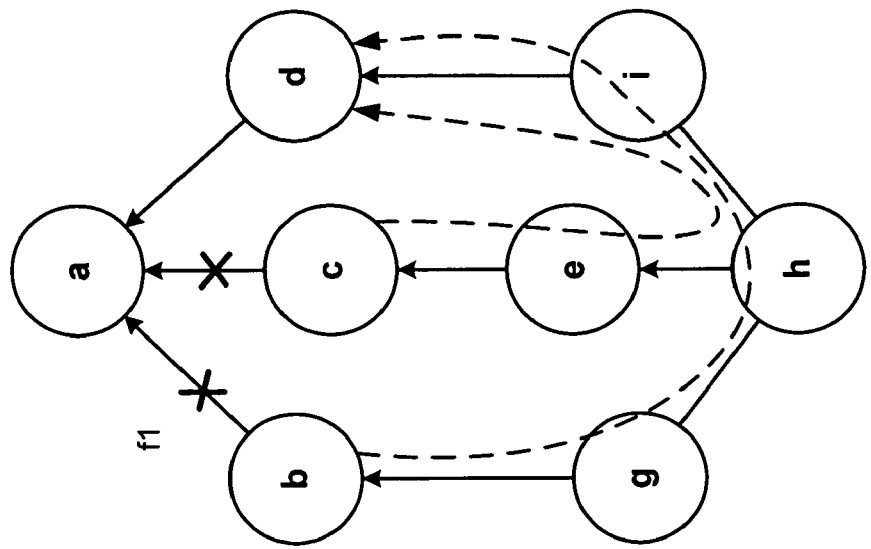
Figure 6A:
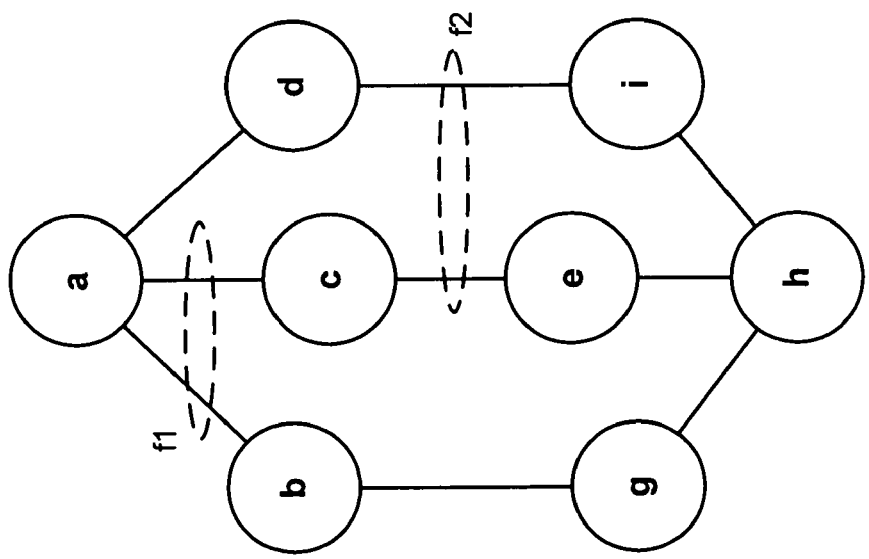
Figure 6C:
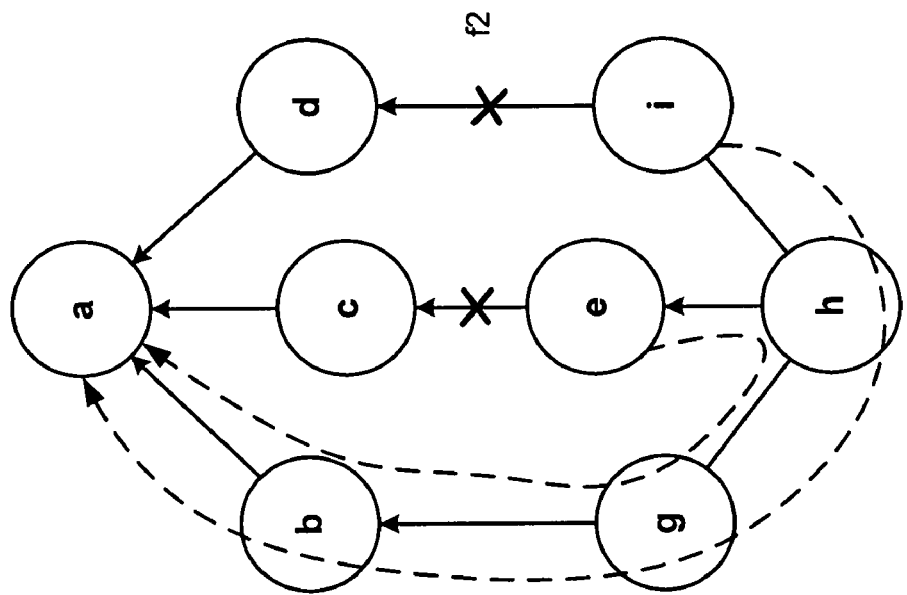

FIG. 6A illustrates the topology of a simple example IP network in which two locations of SRLG failures may occur. FIG. 6B illustrates the IP network of FIG. 6A in a scenario where a first SRLG failure occurs and the rerouting paths in response to that failure. FIG. 6C illustrates the IP network of FIG. 6A in a scenario where a second SRLG failure occurs and the rerouting paths in response to that failure.

Figure 7:
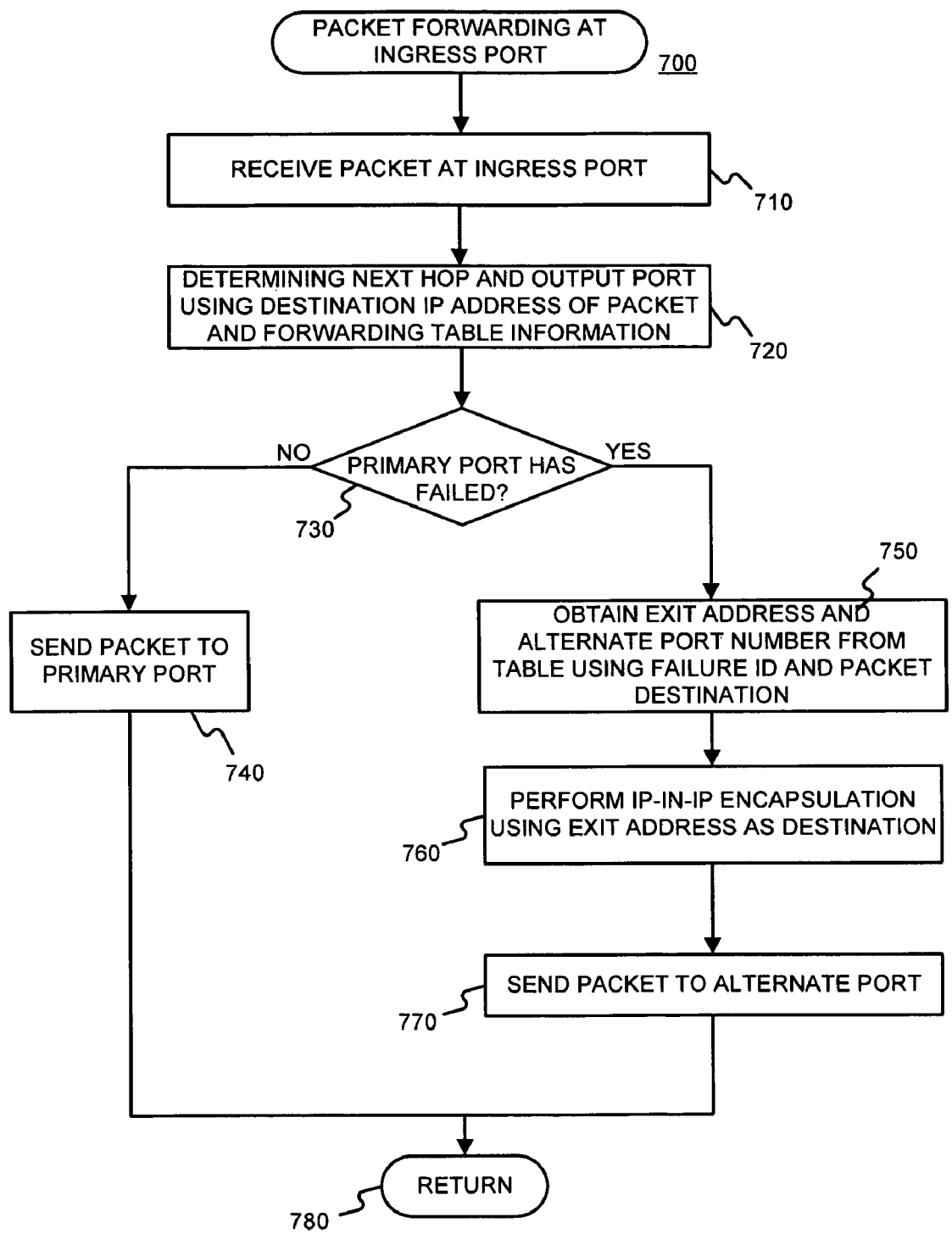

FIG. 7 is a flow diagram of an exemplary method for implementing a forwarding policy for packets received at an ingress line card of a router/node in a manner consistent with the present invention.

Figure 8:
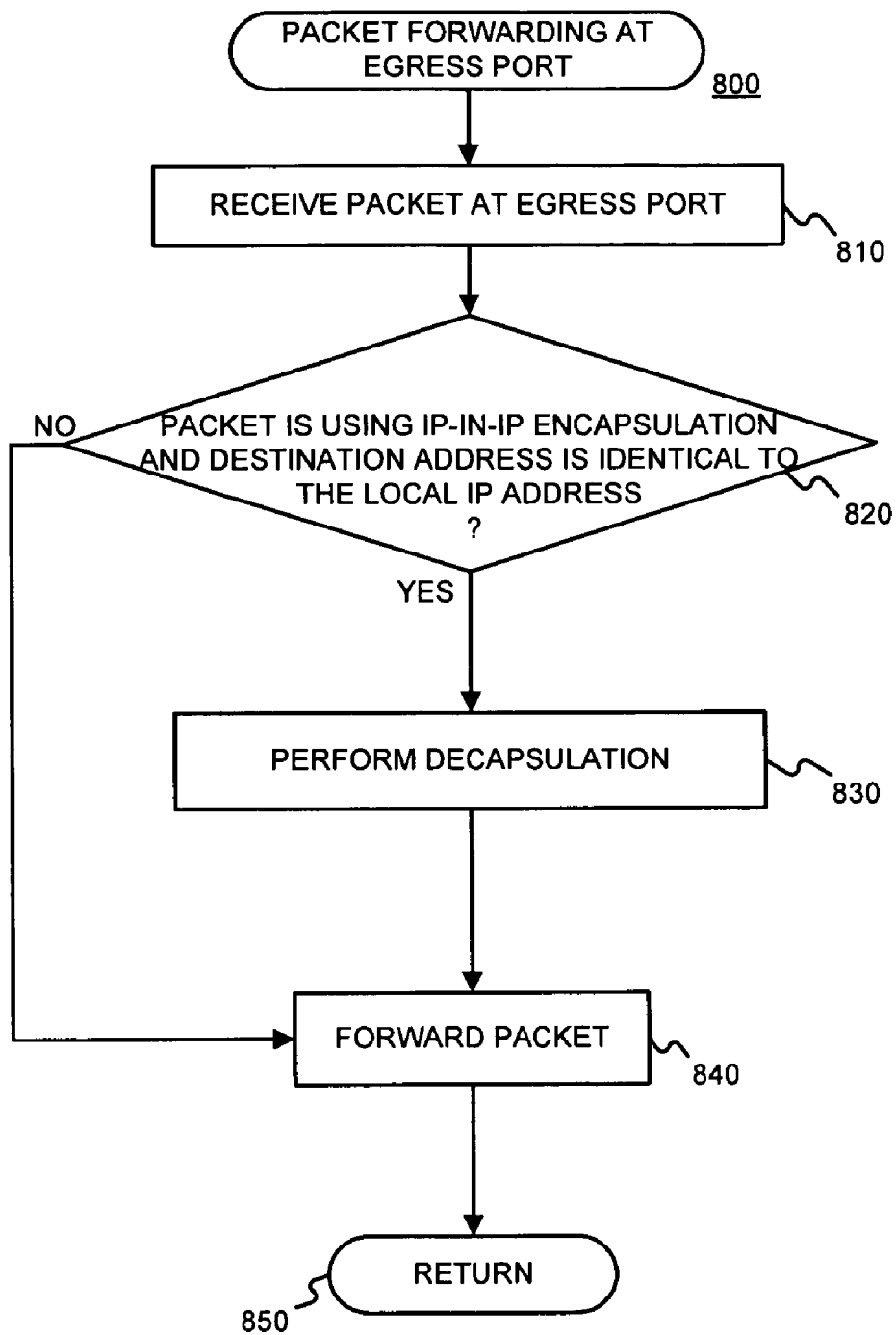

FIG. 8 is a flow diagram of an exemplary method for implementing a forwarding policy for packets received at an egress line card of a router/node in a manner consistent with the present invention.

Figure 9:
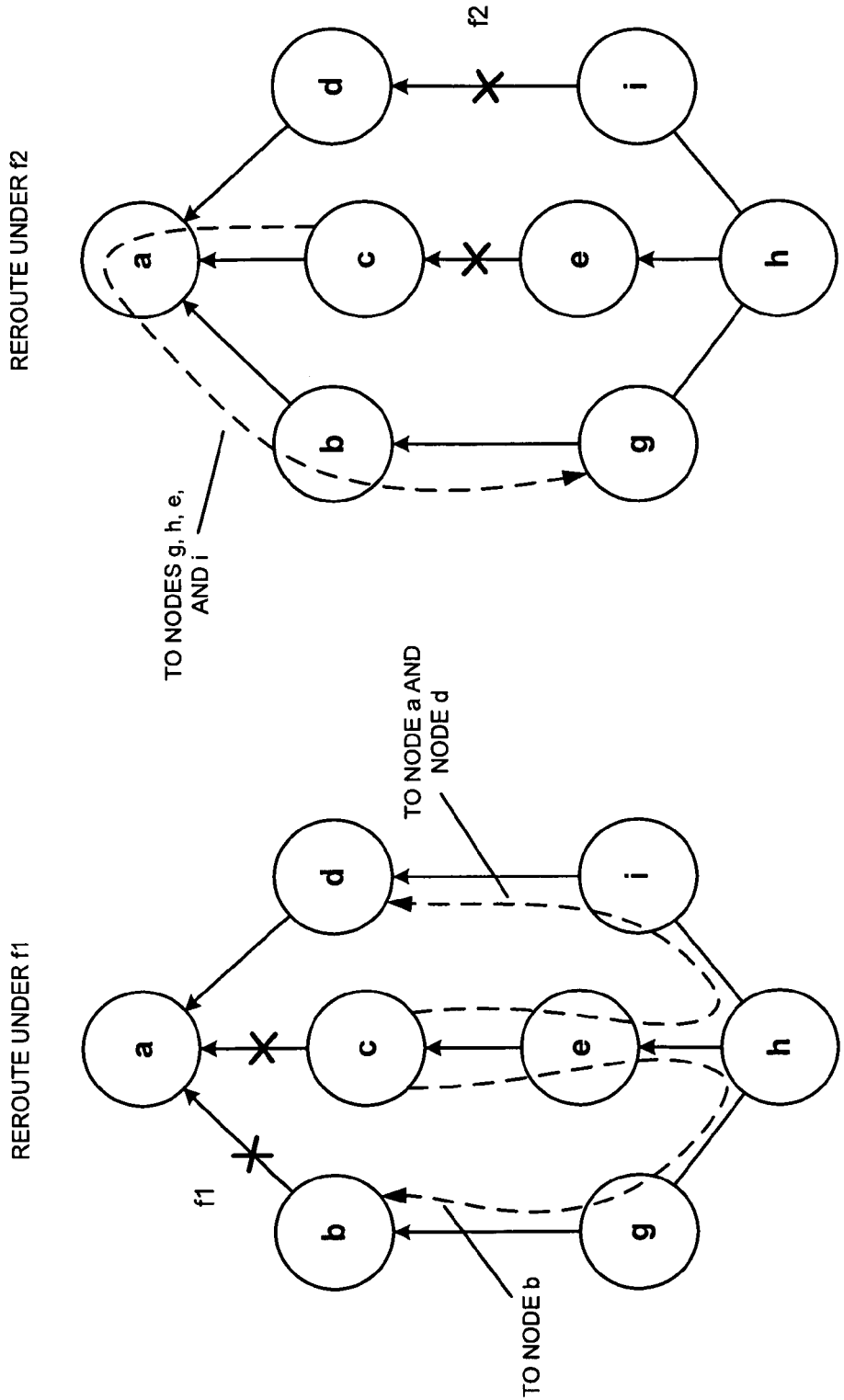

FIG. 9 illustrates the topology of a simple example IP network in which the rerouting paths from node c under two different SRLG failures are depicted.

FIG. 10 illustrates a rerouting table of node c for rerouting packets under the two SRLG failures of the IP network depicted in FIG. 9.

FIG. 11 illustrates a forwarding table of node c to be used in conjunction with the rerouting table of node c for fast rerouting of packets under the two SRLG failures of the IP network depicted in FIG. 9.

Figure 12:
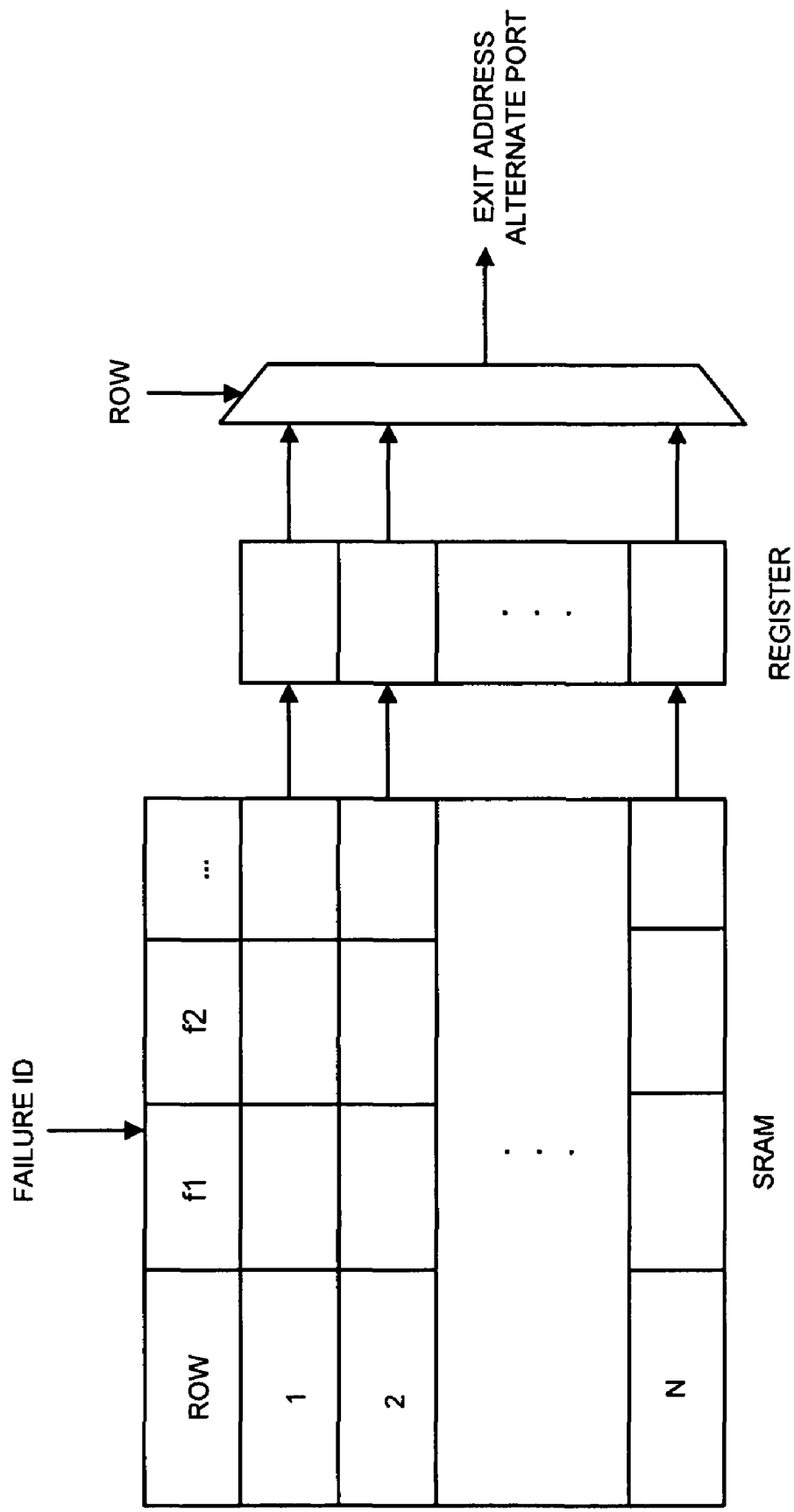

FIG. 12 illustrates an exemplary hardware architecture for fast rerouting table lookup in a manner consistent with the present invention.

Figure 13:
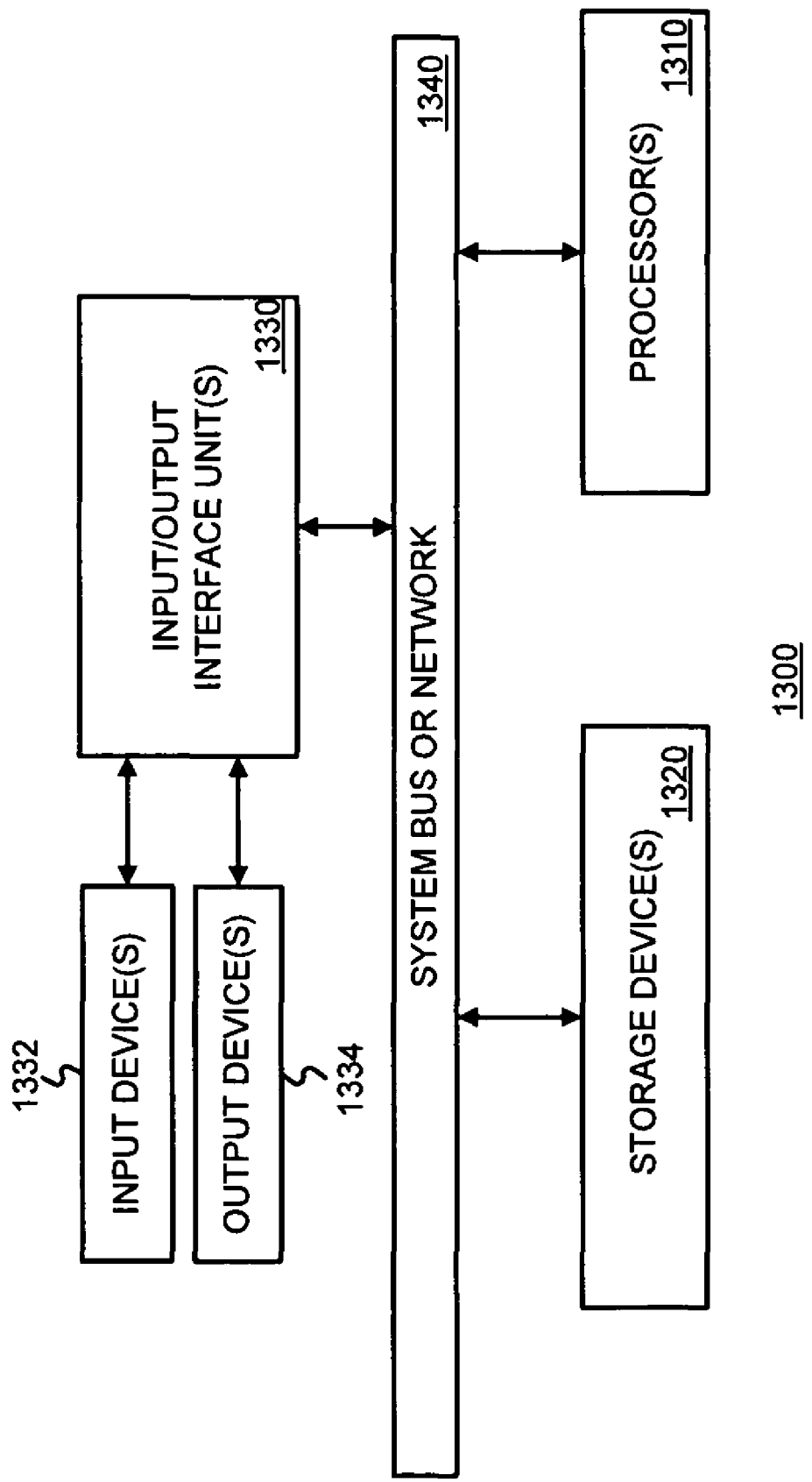

FIG. 13 is a block diagram of an exemplary apparatus that may perform various operations, and store various information generated and/or used by such operations, in a manner consistent with the present invention.

§4. DETAILED DESCRIPTION

The present invention may involve novel methods, apparatus, message formats, and/or data structures to facilitate fast failure recovery from shared risk link group failures using rerouting schemes that determine a node used for rerouting wherein the node has an exit address used for IP-in-IP encapsulation. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Determining Failure Recovery Information

This section provides a detailed explanation of how to determine a node used for rerouting under an SRLG failure wherein the exit address of the node is used for IP-in-IP encapsulation.

Before a mathematical formulation is presented, certain notations and assumptions are made. The notations are defined in Table 1.

TABLE 1

V: Set of all nodes
E: Set of all edges
G: Graph (V, E)
F: Set of all possible SRLG failures
f: An SRLG failure f ∈ F
C(i, j): The least cost between i and j
$C^f$(i, j): The least cost between i and j under failure f
P(s, d): The shortest path from s to d, P(s, d) = $\{p_1, p_2, \ldots, p_m\}$, where $p_1 = s$, $p_m = d$
P(s, d): The shortest path from s to d under failure f,
$P^f$(s, d) = $\{p^f_1, p^f_2, \ldots, p^f_m\}$, where $p^f_1 = s$, $p^f_m = d$ Two assumptions are made. First, the cost on each edge is symmetric (i.e., C(i,j)=C(j,i), ∀i,j ∈V). Second, the graph remains connected under the SRLG failure being considered.

The general problem may be described as follows: Given a graph G, the routing from node s to node d (which could span multiple hops) is considered. If the next hop edge of node s fails due to an SRLG failure $f_1$ it is desired to find a node $x_s^f(d)$ that satisfies the following two conditions:

(1) Node $x_s^f(d)$ can reach node d and the path does not loop back to node s.

(2) The shortest path from node s to $x_s^f(d)$ is not affected by failure f.

Node $x_s^f(d)$ is called the "exit node" of node s for destination d under failure f. With such an exit node, s can quickly resume packet forwarding under failure f by sending packets to $x_s^f(d)$ using IP-in-IP encapsulation.

A detailed mathematical representation is now presented. Given nodes s and d in graph G and a failure f in F, the following algorithm is used to find exit node $x_s^f(d)$ for node s. First, find the next hop from s to d. If the edge is not affected by $f_1$ s does not need an exit node for this recovery, and processing stops. Otherwise, the algorithm advances to the next step. Second, remove all the edges disconnected by the SRLG failure, and find the shortest path $P^f(s,d)$. Third, along path $P^f(s,d)$, find a node $p_k^f$ satisfying the following two conditions:

$$C(s,p_i^f)=C^f(s,p_i^f), i=1, 2, \ldots, k, \quad (1)$$

and $$C(s,p_{k+1}^f)(C^f(s,p_{k+1}^f), \text{ or } p_{k+1}^f=d, \quad (2)$$

and set $x_s^f(d)=p_k^f$ as the exit node of s. Fourth, denote $y_s^f(d)=p_{k+1}^f$ and call it the "exit destination" of node s for destination d under failure f. The edge $x_s^f(d)$-$y_s^f(d)$ is called the "exit bridge". (This is used to ensure that the affected packets are sent to the exit destination after they reach the exit node.) Fifth, the exit node $x_s^f(d)$ has an interface connected to the exit bridge, and the IP address of this interface is set as the "exit address" of node s for destination d under failure f. (This address will be used in the IP-in-IP encapsulation during fast reroute.)

§4.1.1 Exemplary Methods for Determining Failure Recovery Information

Figure 1:
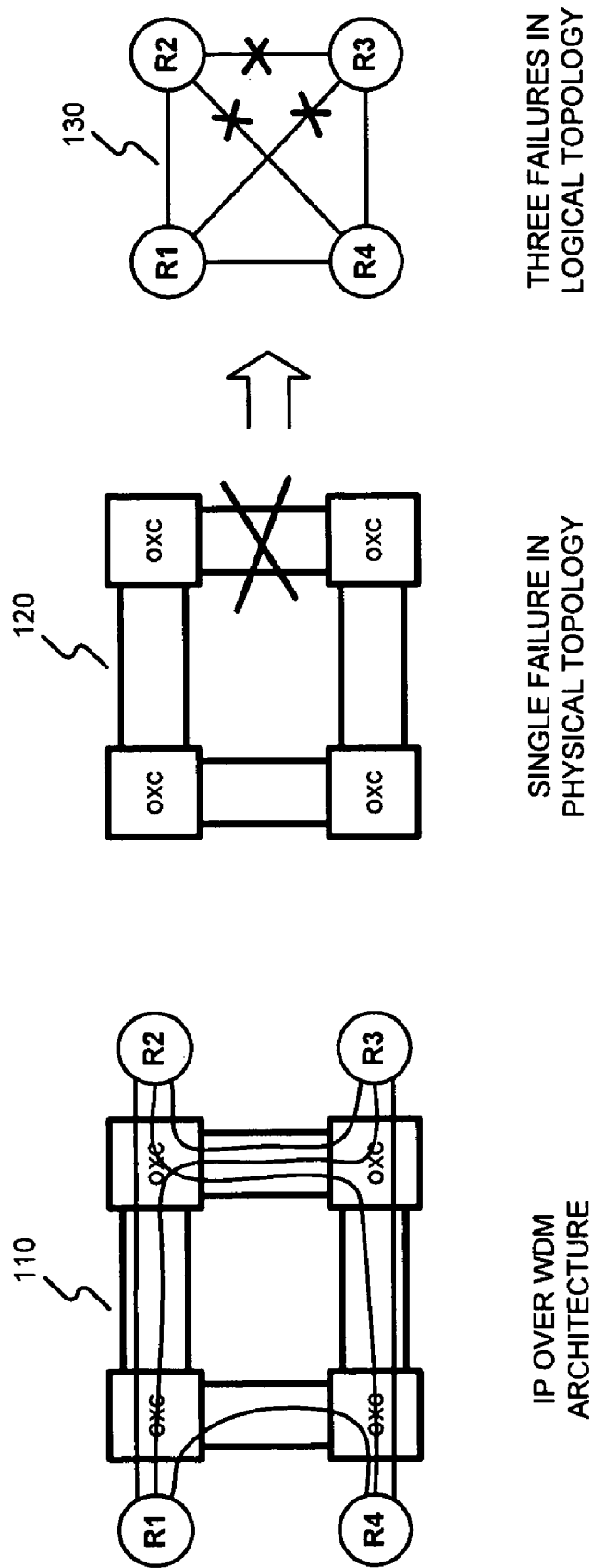
FIG. 1 illustrates a simple IP over wavelength division multiplexing architecture with a shared risk link group failure.
Figure 2:
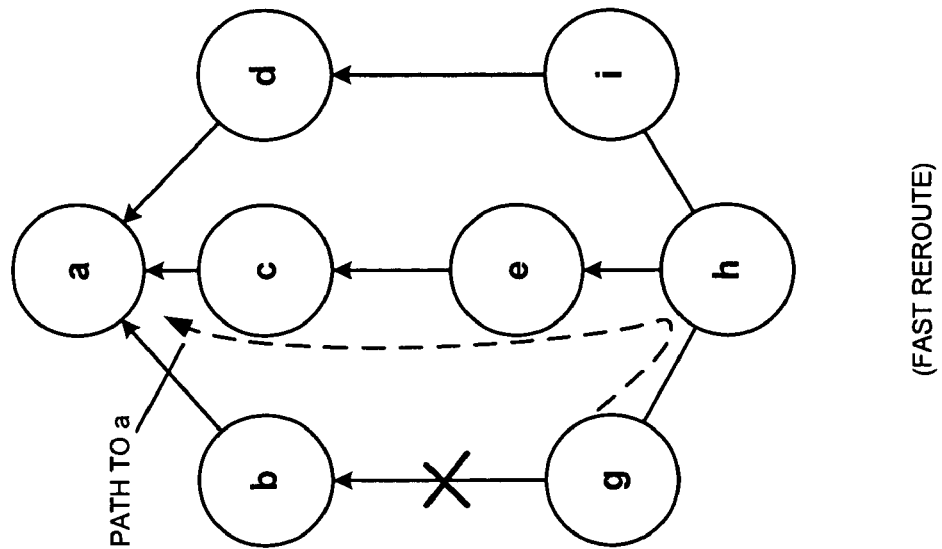
FIG. 2 illustrates an IPFRR failure recovery scheme on the topology of a simple example IP network.
Figure 2:
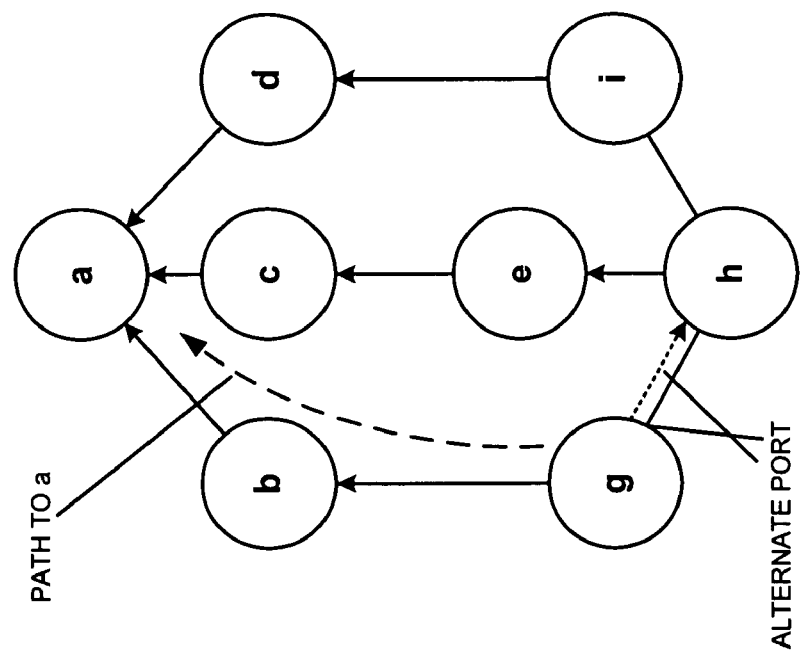
Figure 3A:
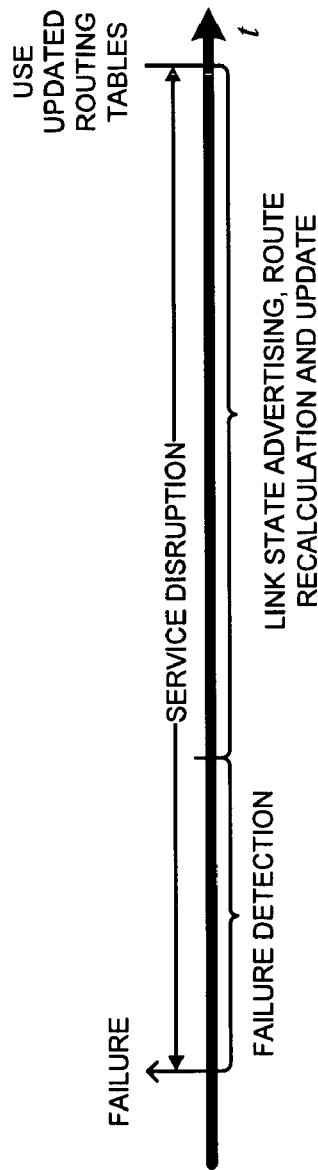
FIGS. 3A and 3B are timing diagrams illustrating a failure and the subsequent failure recovery of a traditional rerouting scheme and an IPFRR scheme, respectively.
Figure 3B:
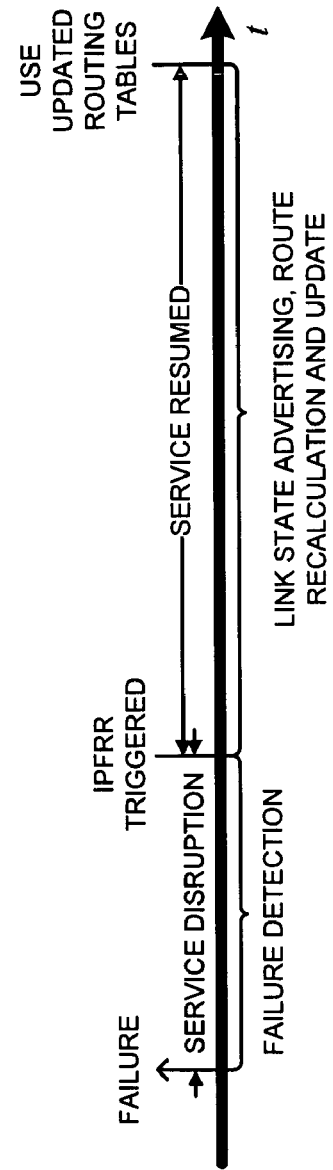
Figure 4:
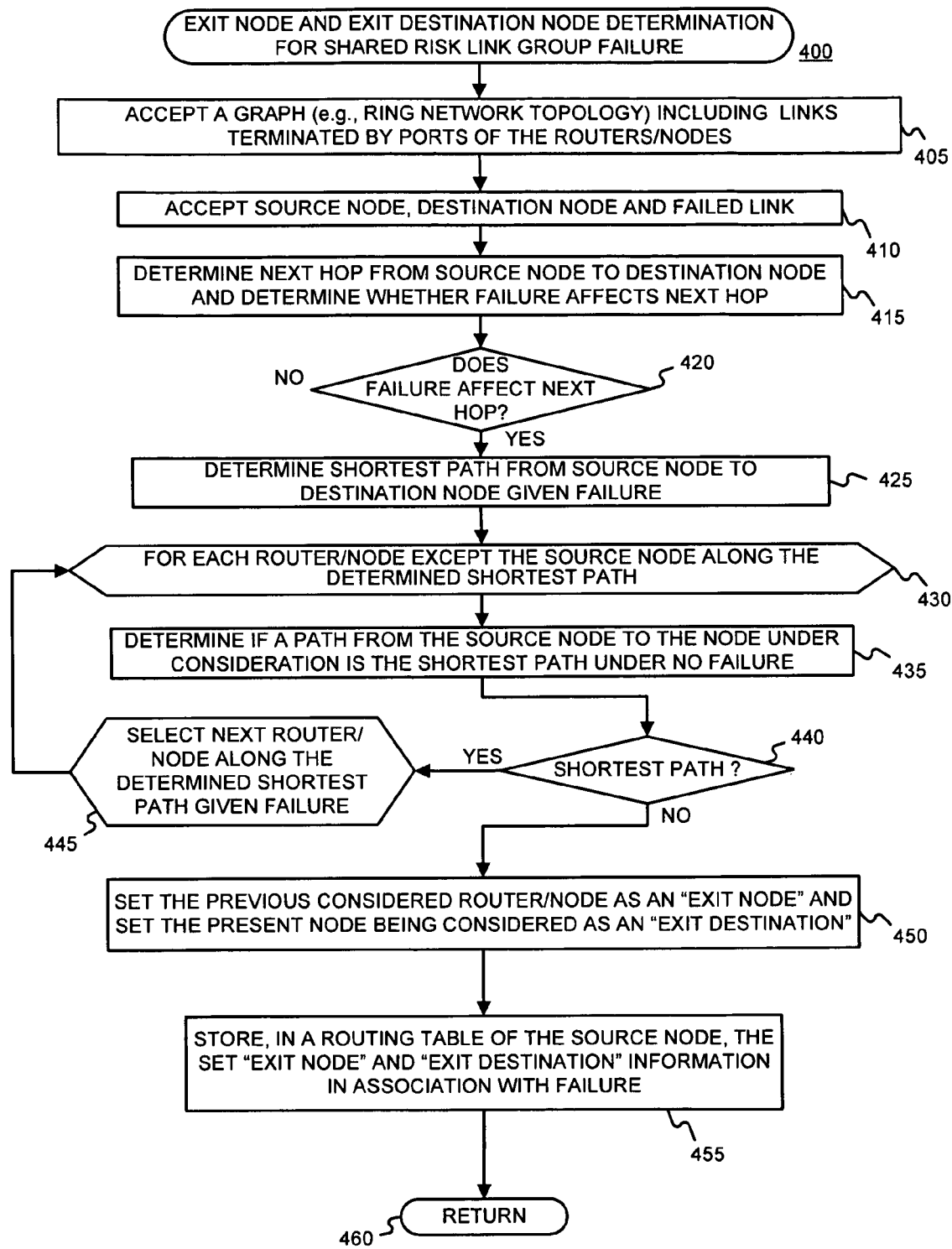
FIG. 4 is a flow diagram of an exemplary method for determining an exit node and exit destination node for a number of nodes in an IP network for use in recovering from SRLG failures affecting the nodes in a manner consistent with the present invention.

FIG. 4 is a flow diagram of an exemplary method 400 for determining an exit node and exit destination node for a number of nodes in an IP network for use in recovering from SRLG failures affecting the nodes, in a manner consistent with the present invention. As shown, the method 400 may accept a graph (e.g., ring network topology) including links terminated by ports of the nodes (e.g., routers). (Block 405) Further, the method 400 may accept a source node, a destination node and a failed link. (Block 410) Subsequently, the method 400 determines the next hop from the source node to the destination node (Block 415) and whether the failure affects the next hop. (Condition 420) If the failure does not affect the next hop, then the method 400 is left. (Block 420 and node 460) Referring back to condition 420, if, on the other hand, the failure affects the next hop, then the method 400 may determine the shortest path from the source node to the destination node given the failure within the graph (i.e., shortest path from source node to destination node avoiding failed links). (Condition 420 and Block 425) Thereafter, for each router/node except the source node along the determined shortest path, the method 400 may determine if a path from the source node to the node under consideration is the shortest path under no failure. (Loop 430 and Block 435) If it is determined that the path from the source node to the node under consideration is the shortest path under no failure, then the method 400 may select the next router/node along the determined shortest path given the failure and repeat steps 430-440. (Condition 440 and loop 445) Referring back to condition 440, if, on the other hand, the path from the source node to the node under consideration is not shortest path, then method 400 may proceed to set the previously considered router/node as an "exit node" and set the present node being considered as an "exit destination". (Condition 440 and 450) Subsequently, the method 400 may store, in a routing table of the source node, the set "exit node" and "exit destination" information in association with the failure (Block 455) before the method 400 is left. (Node 460).

The method 400 may be applied to all routers/nodes within an IP network in a distributed manner such that any source node whose next hop is affected by an SRLG failure can forward packet information to its destination node avoiding the SRLG failure by forwarding the packet information to a determined "exit node" using the exit address obtained by the "exit node"-"exit destination node" bridge to perform IP-in-IP encapsulation.

Referring back to block 455, the method 400 may determine an "exit node" and "exit destination node" for any SRLG failure affecting a source node's next hop. Therefore such "exit node" and "exit destination node" information are stored in the routing table of the source node such that the source node may forward packet information to its destination node given the SRLG failure. A description of such a routing table follows.

§4.1.2 Exemplary Data Structures (e.g., Routing Table)

FIG. 5 is an exemplary data structure of a routing table 500 of a router/node within an IP network which stores information for rerouting packet information given an SRLG failure. The routing table 500 of a node may include a number of information to allow the router/node to reroute packet information to their destination given any SRLG failure affecting the node's next hop. Specifically, each router/node may have such a routing table, and the routing table may include a destination column 510 containing entries specifying all possible destination nodes and a number of failure columns 520a-c. The failure columns 520a-c correspond to all possible SRLG failures that may occur in the IP network. As seen in FIG. 5, each failure column 520 includes "exit address" and "port #" entries corresponding to each destination node. The "exit address" is simply an IP address of the interface of an "exit node" to the link between the "exit node" and an "exit destination node". The "port #" is simply an alternate port number for forwarding the packet information when the next hop (i.e., the primary port) has failed and rerouting is applied. Therefore, each node having such a routing table can reroute packet information to their destination node (when an SRLG failure occurs affecting the next hop) by forwarding the packet information through the node's "port #" towards the "exit node" having the "exit address".

§4.1.3 Example of Determining Failure Recovery Information

FIGS. 6A-6C illustrate an example of exemplary operations consistent with the present invention. FIG. 6A illustrates a network topology wherein all the edges (links) have a cost of 1 except edge a-c, which has a cost of 1.5. In the network topology of FIG. 6A, there are two possible SRLG failures. One SRLG failure, ($f_1$) disconnects a-b and a-c as illustrated in FIG. 6B. The other SRLG failure ($f_2$) disconnects c-e and d-i as illustrated in FIG. 6C. Node a is assumed to be the destination node. Hence rerouting paths to node a are considered. In FIG. 6B, the rerouting paths from source nodes b and c to destination node a under SRLG failure $f_1$ (which affects their next hop) are depicted by the dashed arrows. Similarly, in FIG. 6C, the rerouting paths from source nodes e and i to destination node a under SRLG failure $f_2$ (which affects their next hop) are depicted by the dashed arrows. Operations consistent with the present invention for determining an "exit node" and an "exit destination node" for node b under failure $f_1$ are described next.

To determine the "the exit node" and "exit destination node" for node b under failure $f_1$, the following operations are performed. First, edges (links) a-b and a-c, are removed and the shortest path $P^{f_1}(b,a)=\{b,g,h,i,d,a\}$ is determined. Second, the shortest path $P^{f_1}(b,a)$ is explored for shortest paths. It is determined that {b,g}, {b,g,h}, and {b,g,h,i} are all shortest paths when the network does not have any failures but {b,g, h,i,d} is not. Therefore, node i is set as the "exit node" and node d is set as the "exit destination node". Third, the IP address of node i's interface i→d is set as the exit address of node b for packets destined to node a under failure $f_1$.

Using the same approach, the exit nodes of c, d, and e for the same destination under $f_1$ or $f_2$ can be determined. The results are shown in FIGS. 6B and 6C, where each dashed line arrow shows the path from a node to its exit destination. This procedure also works for single-link failures, which are a special case of SRLG failures in that each group consists of a single edge. Note that, from the above operations (which are in accord with the method 400 of FIG. 4), it is clear how the routing table of FIG. 5 may be populated for each node with exit addresses and alternative port numbers.

§4.2 Forwarding Using Previously Determined Failure Recovery Information

§4.2.1 Exemplary Methods for Forwarding

The packet forwarding operations on a line card may be divided into (1) ingress processing and (2) egress processing. Exemplary methods for performing these two packet forwarding operations are illustrated in FIG. 7 and FIG. 8, respectively.

FIG. 7 is a flow diagram of an exemplary method 700 for implementing a forwarding policy at packets received at an ingress line card of a router/node in a manner consistent with the present invention. In particular, when a packet arrives at the ingress of a line card of a router/node, based on its destination IP address, the method 700 may obtain the next hop and output port from a forwarding table lookup. (Blocks 710 and 720) To distinguish it from the alternate forwarding port used for failure recovery, this obtained output port is called the "primary port". The method 700 may check whether the primary port has failed. (Condition 730) If the primary port has not failed (and is not affected by a network failure), then the method 700 may simply forward the packet through this primary port. (Condition 730 and Block 740) The method 700 is then left. (Node 780) Referring back to condition 730, otherwise, the following steps are performed by the method 700. Specifically, if the primary port has failed, the method 700 may use the destination address of the packet and the failure type/ID to perform a table lookup to obtain the exit address and the corresponding output port (which may be called "an alternate port"). (See FIG. 5 for exit address, alternate port number and destination node.) (Condition 730 and Block 750) Next, the method 700 may perform IP-in-IP encapsulation on the packet information using the obtained exit address as the destination. (Block 760) That is, the outer destination is set to be the exit address. The outer source address need not be used in this scheme. Finally, the method 700 may send the IP-in-IP encapsulated packet information through the alternate port (Block 770) before the method 700 is left (Node 780).

FIG. 8 is a flow diagram of an exemplary method 800 for implementing a forwarding policy for packets received at an egress line card of a router/node in a manner consistent with the present invention. In particular, the processing at the egress is quite simple. When a packet arrives at the egress of a line card of a router/node, the method 800 verifies whether the received packet uses IP-in-IP encapsulation and whether its destination address is identical to router's local IP address. (Block 810 and Condition 820) If the packet is using IP-in-IP encapsulation and its destination address is identical to the IP address of the line card, then the method 800 may perform decapsulation by removing the outer IP header (Block 830) and then forward the inner IP packet (which is the original packet) out of this interface (Block 840) before the method is left (Node 850). Referring back to condition 820, otherwise, the method 800 may forward the packet unchanged (Condition 820 and Block 840) before the method left (Node 850).

§4.2.2 Example of Packet Forwarding under SRLG Failure Recovery

Using FIG. 6B with failure $f_1$ as an example, consider packet forwarding from node b to node a with reference to FIG. 9. The procedure is described below. First, when node b receives a packet destined to node a and detects a failure on the primary port b→a, it performs an IP-in-IP encapsulation where the outer destination address points to node i's interface i→d. This packet is then forwarded to node g. Second, nodes g and h forward the packet using its outer destination address and the packet arrives at node i. Third, the egress of interface i→d realizes that the outer address of the packet is identical to its own address and the packet is IP-in-IP. Therefore, the inner IP packet (which is the original one) is obtained and forwarded to node d. Fourth, node d forwards the packet to its destination as usual.

In certain cases, it is possible that a packet is encapsulated and decapsulated several times due to multiple link failures before it reaches its destination. This is why this rerouting scheme could be referred to as multi-section shortest path first.

§4.3 Alternatives and Refinements

§4.3.1 General Discussions Regarding MSSPF Scheme

Below are of some general discussions applied to the MSSPF (multi-section shortest path first) scheme introduced above for fast IP rerouting under SRLG failures.

§4.3.1.1 General SRLG Failures

For simplicity, each edge in the above examples belongs to one SRLG. In general, a logical link could be a multi-hop wavelength channel, thus belonging to multiple SRLGs. Nonetheless, MSSPF is applicable to this configuration without change.

§4.3.1.2 Cross-Layer Control Plane

MSSPF assumes that routers know which logical links belong to the same SRLG. This requires cross-layer design of the control plane because SRLG configuration is related to the lower layer. Cross-layer visibility has been discussed and the evolution of generalized MPLS (GMPLS) will make this design possible.

§4.3.1.3 Path Length

Compared to NotVia, MSSPF tends to generate shorter rerouting paths. This is because NotVia performs link-based rerouting, where the affected packets will be tunneled to the other side of the failed link. In contrast, MSSPF tries to reach destinations through intermediate nodes (exit nodes).

§4.3.1.4 Recovery Time

It is believed that MSSPF can achieve recovery in less than 50 ms. The scheme does not involve real-time re-route calculations. The packet processing described in §4.2.1 can achieve line speed using a hardware implementation. Therefore, the length of service disruption is determined by failure detection. In optical networks (such as SONET), failure detection can be achieved in approximately 20 ms. Thus achieving sub 50-ms recovery is reasonable.

§4.3.1.5 Application

MSSPF is not supposed to replace route recalculation. Instead, it is designed to complement route recalculation by keeping packet forwarding during route recalculation. This is because the rerouting paths created by MSSPF are not guaranteed to be the shortest.

§4.3.2 Distributed Reroute Determination

The proposed reroute calculation requires global topology information. This information applies to failure recoveries in autonomous systems (AS) running link-state routing protocols, such as OSPF. The procedure described in §4.1 above can be easily implemented in a distributed manner. Given a router s, it only considers the failures that disconnect its adjacent links. For every such failure f, the router performs the following for each destination d. First, remove all the disconnected links. Second, find the shortest path $P^f(s,d)$. Third, if $P(s,d)=P^f(s,d)$, and the primary path is not affected, then no further operation is needed. (Stop) Otherwise, use the same method as described above in §4.1 to find the exit address. Based on the next hop in $P^f(s,d)$, find the output port number at router s and denote it as $u_s^f(d)$.

After this calculation, router s creates a rerouting table. When a failure f disconnects the primary port to destination d, this table indicates which exit address should be used for IP tunneling and what is the next hop output port. FIG. 9 shows the rerouting paths from node c under failures $f_1$ and $f_2$, respectively, where the cost of a-c is 1.5 and all the other links have a cost of 1. FIG. 10 shows the corresponding rerouting table of node c. For simplicity, directed links are used to replace the actual exit address and next hop output port number.

Including next hop port numbers in the table of FIG. 10 reduces implementation complexity since it is not necessary to perform two forwarding table lookups. After the IP-in-IP encapsulation, the output port for the exit address is determined. The usual way is to perform a forwarding table lookup using that address. By storing the port number in the rerouting table, this table lookup can be avoided. In addition, it helps to support equal-cost multiple paths (ECMP).

If the cost of a-c in FIG. 9 were to be changed to 1, node c could maintain two equal cost paths to node i: {c,a,d,i} and {c,e,h,i}. The output port for packets destined to node i could be c→a or c→e, depending on the specific configuration. (In most cases, it is based on hashing the packet header.) When port c→a fails and a packet destined to a is encapsulated to i, using the output port number in the rerouting table of FIG. 10 directly avoids the failed port.

To implement MSSPF, a line card can be used determine exit addresses and output ports in case of SRLG failures. According to the forwarding policy in FIG. 7, the following design is proposed. First, install the rerouting table on each line card. Second, extend the forwarding table. More specifically, let each entry include the index of the rerouting table row that contains the rerouting exit address and next hop port number.

Line cards are used in node c in FIG. 9 as an example. First, the rerouting table of FIG. 10 is installed in the line cards. Second, as shown in FIG. 11, the forwarding table is extended. FIG. 11 illustrates a forwarding table for node c in FIG. 9. Now, suppose $f_1$ occurs and node c in FIG. 9 receives a packet destined to d. A forwarding table lookup of FIG. 11 indicates the output port is c→a and the row number in the rerouting table is 3. Since c→a has failed, the exit address and alternate output port are immediately obtained from row 3 of the rerouting table of FIG. 10. After that, the packet is encapsulated and sent out for fast reroute.

The memory complexity of this implementation lies in the rerouting table and forwarding table extension. The number of rows in the exemplary rerouting table is determined by the number of routers in the AS. The number of columns in the exemplary table is equal to the number of potential SRLG failures in the network. For a network with N routers and F potential SRLG failures, the upper bound of the table size is N×F. Nonetheless, given a specific node, the size of its rerouting table can be substantially reduced by as follows. First, the size can be reduced if only a few of the SRLG failures disconnect its adjacent links. If an SRLG failure is not adjacent to the node, it is not necessary to include it in the rerouting table. For example, the exemplary rerouting table at node d in FIG. 9 does not have a column for $f_2$. Second, multiple destinations could have identical exit addresses and alternate ports. In this case, the corresponding rows can be merged. In the exemplary rerouting table of FIG. 10, rows 1 and 3 can be merged, and rows 4-7 can also be merged. This merge is possible because multiple destinations could share the first section of the rerouting path. With the merge operation, the sizes of rerouting tables can be substantially reduced.

The usual way to store the rerouting table is to use SRAM. Registers could be used to accelerate the table lookup. An exemplary architecture is illustrated in FIG. 12. When a failure occurs, the failure ID is used to locate the corresponding column in the rerouting table and load the entire column to the registers. After that, each table lookup is performed by selecting one of the registers using the row number, which can be completed in a single clock cycle. If table lookup is needed during the loading period and the specific register has not been updated, the loading is interrupted so that the table lookup can be completed directly from memory.

For the forwarding table extension, it is only needed to add a row number to each entry. This does not increase the reading/writing time complexity because the row number, the next hop, and the output port can be accessed in parallel.

§4.4 Exemplary Apparatus

FIG. 13 is high-level block diagram of a machine 1300 that may perform one or more of the processes described above, and/or store information used and/or generated by such processes. The machine 1300 basically includes one or more processors 1310, one or more input/output interface units 1330, one or more storage devices 1320, and one or more system buses and/or networks 1340 for facilitating the communication of information among the coupled elements. One or more input devices 1332 and one or more output devices 1334 may be coupled with the one or more input/output interfaces 1330. The one or more processors 1310 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1320 and/or may be received from an external source via one or more input interface units 1330.

In one embodiment, the machine 1300 may be one or more conventional personal computers, servers, or routers. In this case, the processing units 1310 may be one or more microprocessors. The bus 1340 may include a system bus. The storage devices 1320 may include system memory, such as read only memory (ROM) and/or random access memory (RAM). The storage devices 1320 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1332, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1310 through an appropriate interface 1330 coupled to the system bus 1340. The output devices 1334 may include a monitor or other type of display device, which may also be connected to the system bus 1340 via an appropriate interface. In addition to (or instead of) the monitor, the personal computer may include other (peripheral) output devices (not shown), such as speakers and printers for example.

Thus, at least some features of the present invention may be implemented as computer-executable software (program instructions). Alternatively, or in addition, at least some features of the present invention may be implemented in hardware (e.g., as application specific integrated circuits ("ASICS")).

§4.5 Conclusions

Embodiments consistent with the present invention provide a scheme to achieve fast recovery from SRLG failures in the IP layer. An exemplary scheme consistent with the present invention, called multi-section shortest path first ("MSSPF"), builds on the idea of IP Fast Reroute ("IPFRR"). The present inventors have verified that MSSPF guarantees 100% recovery of SRLG failures and causes no dead loops. Advantageously, it has a low complexity and can be implemented in today's networks running link-state routing protocols such as open shortest path first ("OSPF"). The performance of the exemplary scheme has been validated with a variety of practical and randomly generated topologies.

What is claimed is:

1. A computer-implemented method for determining failure recovery information, given a source node, a destination node, and a shared risk group failure on a next hop from the source node to the destination node, the computer-implemented method comprising:
   a) accepting a graph representing network topology information including the source node and the destination node;
   b) determining an exit node which is able to reach the destination node using a route which does not include the source node, by
      1) determining a shortest path from the source node to the destination node avoiding any link belonging to the shared risk group failure,
      2) for each node of the determined shortest path, except for the source node,
         A) determining if a path from the source node to the node of the determined shortest path under consideration is the shortest path between the source node and the node of the determined shortest path under consideration using any link in the network topology, even those links belonging to the shared risk group failure,
         B) if it is determined that the path from the source node to the node of the determined shortest path under consideration is the shortest path using any link in the network topology, even those links belonging to the shared risk group failure, then processing a next node of the determined shortest path by act (b)(2), otherwise, if it is determined that the path from the source node of the determined to the node shortest path, under consideration is not the shortest path using any link in the network topology, even those links belonging to the shared risk group failure, then setting the node of the determined shortest path, previously under consideration as the exit node; and
   c) storing, at the source node and in association with the shared risk group failure, both (1) a network address associated with the exit node and (2) an alternative output port of the source node using the shortest path from the source node to the exit node that does not include the shared risk group failure.

2. The computer-implemented method of claim 1 wherein the network address associated with the exit node is a network address of an egress line card on the determined node.

3. The computer-implemented method of claim 1 wherein the network address associated with the exit node is a network address of an egress line card on the exit node, and wherein the egress line card terminates a link to the last processed node.

4. The computer-implemented method of claim 1 wherein the shared risk group failure includes at least one of (A) a link failure and (B) a node failure.

5. A computer-implemented method for forwarding a received packet by a receiving node, the computer-implemented method comprising:
   a) determining destination information from the received packet;
   b) using the determined destination information to lookup a primary output port for forwarding the packet;
   c) determining whether or not the primary output port has failed; and
   d) if it is determined that the primary output port has not failed, forwarding the received packet on the determined primary output port, otherwise, if it is determined that the primary output port has failed
      1) obtaining an exit address and an alternative output port using a shared risk group failure identifier and the determined destination information, wherein the exit address corresponds to a node which is able to reach the destination of the received packet, and wherein a path from the receiving node to the node is a shortest path from the receiving node to the node using any link in the network topology, even those links belonging to the shared risk group failure, and wherein the exit address and the alternative output port are determined before the determination that the primary output port has failed,
      2) encapsulating the received packet for forwarding to the obtained exit address to generate an encapsulated packet, and
      3) forwarding the encapsulated packet on the obtained alternative output port.

6. The computer-implemented method of claim 5 wherein the act of encapsulating the received packet uses IP-in-IP encapsulation, and wherein the encapsulated packet has a second destination address.

7. The computer-implemented method of claim 6 wherein it was determined that the primary output port failed, the method further comprising:
   e) receiving the encapsulated packet at another node;
   f) determining whether the second destination address of the encapsulated packet is the same as the address of the other node; and
   g) if it is determined that the second destination address of the encapsulated packet is the same as the address of the other node, then deencapsulating the encapsulated packet and forwarding the packet, otherwise, forwarding the encapsulated packet using the second destination address.

8. The computer-implemented method of claim 5 wherein the shared risk group failure includes at least one of (A) a link failure and (B) a node failure.

9. Apparatus for determining failure recovery information, given a source node, a destination node, and a shared risk group failure on a next hop from the source node to the destination node, the apparatus comprising:
- a) means for accepting a graph representing network topology information including the source node and the destination node;
- b) means for determining an exit node which is able to reach the destination node using a route which does not include the source node, by
  - 1) determining a shortest path from the source node to the destination node avoiding any link belonging to the shared risk group failure,
  - 2) for each node of the determined shortest path, except for the source node,
    - A) determining if a path from the source node to the node of the determined shortest path under consideration is the shortest path between the source node and the node of the determined shortest path under consideration using any link in the network topology, even those links belonging to the shared risk group failure,
    - B) if it is determined that the path from the source node to the node of the determined shortest path under consideration is the shortest path using any link in the network topology, even those links belonging to the shared risk group failure, then processing a next node of the determined shortest path by act (b)(2), otherwise, if it is determined that the path from the source node of the determined shortest path to the node under consideration is not the shortest path using any link in the network topology, even those links belonging to the shared risk group failure, then setting the node of the determined shortest path, previously under consideration as the exit node; and
- c) means for storing, at the source node and in association with the shared risk group failure, both (1) a network address associated with the exit node and (2) an alternative output port of the source node using a shortest path from the source node to the exit node that does not include the shared risk group failure.

10. The apparatus of claim 9 wherein the shared risk group failure includes at least one of (A) a link failure and (B) a node failure.

11. Apparatus for forwarding a received packet by a receiving node, the apparatus comprising:
- a) means for determining destination information from the received packet;
- b) means for using the determined destination information to lookup a primary output port for forwarding the packet;
- c) means for determining whether or not the primary output port has failed; and
- d) means for forwarding the received packet on the determined primary output port if it is determined that the primary output port has not failed, and otherwise, if it is determined that the primary output port has failed
  - 1) obtaining an exit address and an alternative output port using a shared risk group failure identifier and the determined destination information, wherein the exit address corresponds to a node which is able to reach the destination of the received packet, and wherein a path from the receiving node to the node is a shortest path from the receiving node to the node using any link in the network topology, even those links belonging to the shared risk group failure, and wherein the exit address and the alternative output port are determined before the determination that the primary output port has failed,
  - 2) encapsulating the received packet for forwarding to the obtained exit address to generate an encapsulated packet, and
  - 3) forwarding the encapsulated packet on the obtained alternative output port.

12. The apparatus method of claim 11 wherein it was determined that the primary output port failed, the apparatus further comprising:
- e) means for receiving the encapsulated packet at another node;
- f) means for determining whether the second destination address of the encapsulated packet is the same as the address of the other node; and
- g) means for deencapsulating the encapsulated packet and forwarding the packet if it is determined that the second destination address of the encapsulated packet is the same as the address of the other node, otherwise, forwarding the encapsulated packet using the second destination address.

13. The apparatus of claim 11 wherein the shared risk group failure includes at least one of (A) a link failure and (B) a node failure.

* * * * *